United States Patent [19]

Welch

[11] 3,891,327

[45] June 24, 1975

[54] MOUNTED SLIDES AND METHOD OF SECURING A COVER GLASS TO A GLASS SLIDE HAVING A SPECIMEN THEREON

[75] Inventor: Mary Jeanne Welch, Timonium, Md.

[73] Assignee: W. R. Grace & Co., New York, N.Y.

[22] Filed: Nov. 23, 1973

[21] Appl. No.: 418,519

Related U.S. Application Data

[63] Continuation-in-part of Ser. No. 411,933, Nov. 1, 1973, abandoned.

[52] U.S. Cl. .................... 356/244; 117/3; 161/187; 204/159.14; 350/92; 350/320; 356/36
[51] Int. Cl. ... G01n 21/16; G01n 1/00; G02b 21/34
[58] Field of Search ........ 356/36, 244; 350/92, 320; 117/3; 161/187; 156/108; 204/159.14

[56] References Cited
UNITED STATES PATENTS

| | | | |
|---|---|---|---|
| 2,964,443 | 12/1960 | Dereich | 356/244 |
| 3,551,023 | 12/1970 | Brackett | 356/244 |

*Primary Examiner*—Vincent P. McGraw
*Attorney, Agent, or Firm*—Richard P. Plunkett; Kenneth E. Prince

[57] ABSTRACT

This invention relates to mounted slides and to a mounting medium for histological and biological specimens on a glass slide overlayed with a cover glass, said specimen and cover glass being bonded to the glass slide in a fixed position by an optically transparent, liquid, photosensitive composition formed by exposing said composition to U. V. radiation.

4 Claims, No Drawings

MOUNTED SLIDES AND METHOD OF SECURING A COVER GLASS TO A GLASS SLIDE HAVING A SPECIMEN THEREON

This invention relates to a mounting medium for histological and biological specimens. More particularly this invention relates to the preparation of specimens for microscopic examination and maintaining said specimens in a fixed position between the glass slide and a cover glass.

Ordinarily for microscopic examination, a cover glass is mounted over the specimen on the glass slide by bonding the cover glass to the slide by means of a resin in solution. Upon evaporation of the solvent, the resin bonds the cover glass to the slides. Well known resins used for this purpose include Canada balsam, gum damar and various well known synthetic resins, e.g. cycloparaffin or naphthene polymers. However these resins have several drawbacks including but not limited to insufficient transparency (a relatively low refractive index), coloring with age, insufficient inertness to the specimen which increases with aging, increased acidity on aging, especially in the case of natural resins such as Canadian balsam, brittleness on hardening which can cause slides to crack, a tendency to crystallize which causes an unsightly border around the cover glass, a tendency to soften under elevated temperature conditions such as when the slides are subjected to microprojection work involving carbon arc machines.

One object of the instant invention is to provide a novel bonding agent that will secure the cover glass and specimen to the glass slide without the aforestated drawbacks. Other objects and advantages of this invention will be apparent from a reading hereinafter.

In accord with the present invention the cover glass is bonded to the glass slide having the specimen thereon by means of a substantially uniformly thick layer of an optically transparent, liquid photosensitive composition. The liquid photosensitive composition upon exposure to UV radiation in the wavelength range 2,000–4,000 angstroms hardens to a transparent solid which bonds the cover glass and the specimen in a fixed position to the glass slide. The liquid photosensitive composition prior to curing may readily be smeared, poured, siphoned, brushed, sprayed, added dropwise or otherwise applied to the specimen carrying slide and the cover glass is then placed in position thereover. The photosensitive composition spreads over the specimen between the slide and the cover glass and upon exposure of the mounting medium through either the glass slide or the cover glass to UV radiation, a transparent solid which bonds the cover glass and the specimen to the glass slide in a fixed position results. The thin film of the bonding agent is substantially colorless and transparent. For any reason should it be desirable that the specimen not be in contact with the mounting medium, the mounting medium can be applied to the glass slide around the specimen and the cover glass pressed firmly into the liquid mounting medium and against the specimen and then cured. Such an operation will also hold the specimen and cover glass in a fixed position on the glass slide.

The use of a photosensitive composition for preparing microscopic slides has the following advantages. For example, after irradiation, if a slide is dropped and the glass breaks, the specimen because it is embedded or encapsulated in the solid photosensitive composition which does not break, is not irretrievably lost. Furthermore biological specimens are protected against attack by fungus by virtue of the fact that it is completely embedded or encapsulated by the solid photosensitive composition. Fungal attack often destroys slides prepared in natural resins, e.g. Canadian balsam. A primary advantage of the instant invention is the speed and convenience of slide preparation. That is, it takes no more than about 5 minutes to prepare and UV cure a specimen in a fixed position between the glass slide and cover slide with the photosensitive bonding agent of the instant invention. This contrasts with up to 2 or 3 days required for conventional systems to dry the solvent in which the resinous bonding agent is applied.

As used herein the term "photosensitive composition" means liquid compositions having a viscosity of 50–2,000,000 centipoises at 25°C. which are photopolymerizable, photocrosslinkable or both and which on exposure to UV radiation, form a solid, optically transparent bond, chemically inert to the specimen, and holding the cover glass and the specimen in a fixed position on the glass slide.

One photosensitive composition operable herein consists essentially of (1) 98 to 2 percent by weight of said composition of a polyene containing at least two reactive unsaturated carbon to carbon bonds per molecule, (2) 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than 4, and (3) 0.0005 to 50 percent by weight of said composition of a photoinitiator. This photosensitive composition on exposure to UV radiation cures to a solid polythioether bonding agent. In Example I herein these photosensitive compositions are represented by Photosensitive Compositions A through C.

Another composition consists essentially of an acrylate, methacrylate or mixtures thereof plus 0.0005 to 50 percent by weight of a photoinitiator capable of initiating vinyl polymerization. In Example I herein these photosensitive compositions are represented by Photosensitive Compositions D and E which undergo both photopolymerization and photocrosslinking on exposure to UV radiation.

Another composition consists of an unsaturated ester, preferably an allylic ester (but not restricted to) plus 0.0005 to 50 percent by weight of a photoinitiator capable of initiating polymerization through the unsaturated groupings. In Example I herein these photosensitive compositions are represented by Photosensitive Compositions F and G which undergo both photopolymerization and photocrosslinking on exposure to UV radiation.

One photosensitive composition comprising the polyene/polythiol photocurable composition herein which can be cured rapidly as a bonding agent by the practice of the instant invention is set out in U.S. Pat. Nos. 3,661,744, 3,697,395, 3,697,396, 3,697,402 and 3,700,574 assigned to the same assignee which are all divisional patents of application having Ser. No. 617,801, filed Feb. 23, 1967, now abandoned and are all incorporated herein by reference. That is, one group of polyenes operable in the instant invention are those having a molecular weight in the range 50 to 20,000 of the general formula:

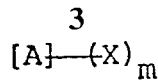

wherein X is a member of the group consisting of

and R-C≡C-; m is at least 2; R is independently selected from the group consisting of hydrogen, halogen, aryl, substituted aryl, cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjunction with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of said operable polyenes include, but are not limited to 1. crotyl-terminated polyurethanes which contain two "reactive" double bonds per average molecule in a near terminal position of the average general formula:

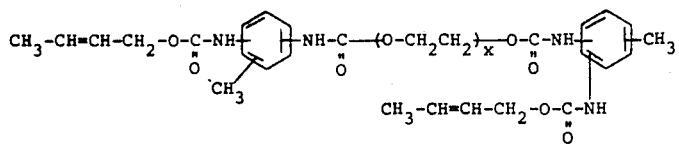

wherein $x$ is at least 1.

2. ethylene/propylene/non-conjugated diene terpolymers, such as "Nordel 1040" manufactured by DuPont which contains pendant "reactive" double bonds of the formula: $-CH_2-CH=CH-CH_3$, 3. the following structure which contains terminal "reactive" double bonds:

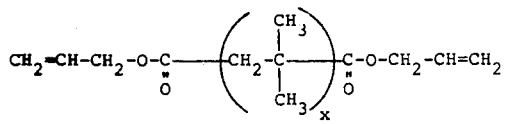

where $x$ is at least 1, 4. the following structure which contains near terminal "reactive" double bonds

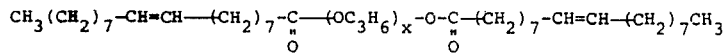

where $x$ is at least 1.

As used herein polyenes and polyynes refer to simple or complex species of alkenes or alkynes having a multiplicity of pendant, terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity all these classes of compounds will be referred to hereafter as polyenes.

A second group of polyenes operable herein in combination with a polythiol includes unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation, e.g., adipic acid-butenediol, 1,6-hexanediaminefumaric acid and 2,4-tolylene diisocyanate-butenediol condensation polymers and the like.

A third group of polyenes operable in combination with a polythiol herein as the bonding composition includes those polyenes in which the reactive unsaturated carbon to carbon bonds are conjugated with adjacent unsaturated groupings. Examples of operable reactive conjugated ene systems include, but are not limited to the following:

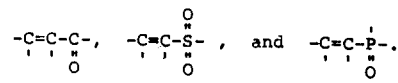

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1175, the triacrylate of the reaction product of trimethylolpropane with 20 moles of ethylene oxide, and the like.

Another group of polyenes operable in combination with a polythiol herein as part of the bonding agent having an -ene or -yne functionality of at least two are formed by reacting either:

a An organic epoxide containing at least two

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or b An organic epoxide containing at least one organic substitutent containing a reactive ethylenically or ethynylically unsaturated group with a member of the group consisting of hydrazine and an organic material containing at least two active hydrogen functions from the group consisting of

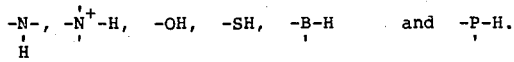

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near-terminally in a branch of the main chain as contrasted to a position at or near the ends of the main chain. For purposes of brevity all of these positions will be referred to generally as "terminal" unsaturation.

The liquid polyenes operable in the first group of polyenes described above in the instant invention which react with a polythiol to form a cured polythioether bond contain one or more of the following types of non-aromatic and non-conjugated "reactive" carbon to carbon unsaturation:

| (1) | —CH=CH— | (5) | —C=C— |
| (2) | —C≡C— | (6) | —C=CH— |
| (3) | —CH=CH$_2$ | (7) | —CH=C— |
| (4) | —C≡CH | (8) | —C=CH$_2$ |

These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as:

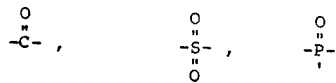

and the like so as to form a conjugated system of unsaturated bonds exemplified by the following structure:

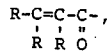

etc. On the average, the polyenes reacted with the polythiols must contain 2 or more "reactive" unsaturated carbon to carbon bonds/molecule and have a viscosity in the range from 50 to 2 million centipoises at 25°C. Included in the term "polyenes" as used herein are those materials which in the presence of an inert solvent, aqueous dispersion or plasticizer fall within the viscosity range set out above at 25°C. Operable polyenes in the instant invention have molecular weights in the range 50–20,000, preferably 500 to 10,000.

As used herein the term "reactive" unsaturated carbon to carbon groups means groups having the structures as shown in 1–8 supra which will react under proper conditions as set forth herein with thiol groups to yield the thioether linkage

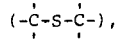

as contrasted to the term "unreactive" carbon to carbon unsaturation which means

groups when found in aromatic nucleii (cyclic structures exemplified by benzene, pyridine, anthracene, and the like) which do not under the same conditions react with thiols to give thioether linkages. In the instant invention, the bonding agent from the reaction of polyenes with polythiols which contain 2 or more thiol groups per average molecule are called polythioether polymers or polythioethers.

As used herein, the term polythiols refers to simple or complex organic compounds having a multiplicity of pendant or terminally positioned -SH functional groups per average molecule.

On the average the polythiols must contain 2 or more —SH groups/molecule. They usually have a viscosity range of 0 to 20 million centipoises (cps) at 70°C as measured by a Brookfield Viscometer. Included in the term "polythiols" as used herein are those materials which in the presence of an inert solvent, aqueous dispersion or plasticizer fall within the viscosity range set out above at 70°C. Operable polythiols in the instant invention usually have molecular weights in the range 94–20,000, preferably 100–10,000.

The polythiols operable in the instant invention can be exemplified by the general formula: $R_{11}$—$(SH)_n$ where $n$ is at least 2 and $R_{11}$ is a polyvalent organic moiety free from reactive carbon to carbon unsaturation. Thus $R_{11}$ may contain cyclic groupings and minor amounts of hetero atoms such as N, S, P or O but primarily contains carbon-hydrogen, carbon-oxygen, or silicon-oxygen containing chain linkages free of any reactive carbon to carbon unsaturation.

One class of polythiols operable with polyenes in the instant invention to obtain a polythioether bond are esters of thiol-containing acids of the general formula: HS—$R_9$—COOH where $R_9$ is an organic moiety containing no "reactive" carbon to carbon unsaturation with polyhydroxy compounds of the general structure: $R_{10}$—$(OH)_n$ where $R_{10}$ is an organic moiety containing no "reactive" carbon to carbon unsaturation and n is 2 or greater. These components will react under suitable conditions to give a polythiol having the general structure:

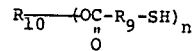

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include, but are not limited to, esters of thioglycolic acid (HS—CH$_2$COOH), α-mercaptopropionic acid (HS—CH(CH$_3$)—COOH) and β-mercaptopropionic acid (HS—CH$_2$CH$_2$COOH) with polyhydroxy compounds such as glycols, triols, tetraols, pentaols, hexaols, etc. Specific examples of the preferred polythiols include, but are not limited to, ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene ether glycol (e.g., Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and useful mounting mediums.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality (f) of three. A polymeric dithiol is a polythiol with an average of two thiol groups per molecule and thus has a functionality (f) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations along) may in fact have an effective functionality of somewhat less than 2. In an attempted synthesis of a diene from a glycol in which the reaction proceeds to 100 percent of the theoretical value for complete reaction, the functionality (assuming 100 percent pure starting materials) would be 2.0. If however the reaction were carried to only 90 percent of theory for complete reaction, about 10 percent of the molecules present would have only one ene functional group, and there may be a trace of materials that would have no ene functional groups at all. Approximately 90 percent of the molecules, however, would have the desired diene structure and the product as a whole then would have an actual functionality of 1.9. such a product is useful as a mounting medium in the instant invention and is referred to herein as having a functionality of 2.

To obtain the maximum strength, solvent resistance, creep resistance, heat resistance and freedom from tackiness, the reactive mounting medium components consisting of the polyenes and polythiols of this invention are formulated in such a manner as to give solid, crosslinked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The acrylates, methacrylates or mixtures thereof can be employed as the photosensitive composition in such a manner that the component can undergo solely homopolymerization, copolymerization or crosslinking dependent upon the reactant composition. For example if an acrylate monomer such as n-butyl methacrylate and a photoinitiator were the sole reactants, a homopolymerization would occur to form the bonding agent without the presence of any crosslinks. If an acrylate monomer and a methacrylate monomer, e.g. methylacrylate and isopropylmethacrylate, were compounded with a photoinitiator, a copolymerized bonding agent would result on exposure to UV radiation without any crosslinks. On the other hand, should a material that contains more than one vinyl polymerizable group per molecule, e.g. ethylene glycol diacrylate or trimethylol propane triacrylate, be reacted with a photoinitiator and exposure to UV radiation, a crosslinked bonding agent which resulted from vinyl polymerization would result.

Various photoinitiators are operable herein and well known to those skilled in the art. Examples of some photoinitiators include, but are not limited to benzoin, benzoin methyl ether, benzoin isobutyl ether, benzophenone, acetophenone, acenapthene-quinone, methyl ethyl ketone, valerophenone, hexanophenone, γ-phenylbutyrophenone, p-morpholinopropiophenone, dibenzosuberone, 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, 1-naphthaldehyde, 4,4'-bis (dimethylamino)benzophenone, fluorene-9-one, 1'-acetonaphthone, 2'-acetonaphthone and 2,3-butanedione. These photoinitiators are added in an amount ranging from 0.0005 to 50 percent by weight of the composition and when used in conjunction with UV radiation greatly reduce exposure times.

The preferred means of causing the photosensitive composition to react and form a bond is by means of electromagnetic radiation of wavelength of about 2,000–4,000 A (because of simplicity, economy and convenience). When UV radiation is used for the reaction, a dose in the range 0.0004 to 6.0 watts sec./cm$^2$ is employed.

Thus the photosensitive compositions operable herein as bonding agents comprise at least one optically transparent liquid photosensitive material in combination with 0.0005 to 50 percent by weight of the photosensitive material of a photoinitiator.

The mounting medium photosensitive compositions used in the present invention may, if desired, include such additives as antioxidants, accelerators, inhibitors, activators, flame-retardant agents, thickeners, surface-active agents, viscosity modifiers, plasticizers and the like within the scope of this invention. Such additives are usually blended with the photosensitive composition during the compounding step. The aforesaid additives may be present in quantities up to 500 parts or more per 100 parts of the photosensitive composition by weight and preferably 0.005–300 parts on the same basis.

The photosensitive mounting medium is usually applied to the glass slide or cover glass in thicknesses ranging from 0.01 to 5.0 mils, preferably about 0.2 to 1.0 mil.

The adhesive may be a single component, e.g. the admixed polyene-polythiol; or a multi component, e.g. mix the polyene and the polythiol and apply on the site. It is preferred to use the single component system due to its ease of usage.

The amount of the photosensitive composition used as a bonding agent is dependent upon the thickness of the specimen. The specimen typically will vary in thickness from about 1 to about 15 microns and thus sufficient photosensitive composition is added to seal the specimen in a fixed position and maintain the cover glass in a bonded relationship to the glass slide over the specimen. The photosensitive composition which is usually applied to the glass slide and specimen dropwise is readily spread on the glass slide. The photosensitive composition can also, if desired, be applied to the cover glass. The cured bonding agent is chemically inert and does not fade or dissolve the slides or effect the specimens thereon, even upon aging. Furthermore the photosensitized mounting medium does not crack or darken upon aging but remains clear and transparent. The cured photosensitized mounting medium does not develop acidity with age and can withstand high temperature light sources such as in microprojection work without softening of the bond between the slides and the cover glass.

To insure that the reaction does not react prior to use, stabilizers are usually added to the photosensitive composition. Operable stabilizers include various well known commercially available materials such as hydroquinone, paramethoxyphenol, octadecyl β(4-hydroxy-3,5-di-t-butylphenyl) propionate commercially available from Geigy Chemical Co., under the tradename "Irganox 1076," 2,6-ditertiary-butyl-4-methylphenol commercially available under the tradename "Ionol" from Shell Chemical Co., pyrogallol, phosphorous acid and the like. The stabilizers are usually added in amounts ranging from 0.01 to 5.0 parts per 100 parts by weight of the photosensitive composition. In some instances, heat up to about 60°C is employed to dissolve the stabilizers in the photosensitive composition. Additionally in some cases where necessary a minor amount of a solvent, e.g. methanol is used to dissolve the stabilizers prior to their addition to the photosensitive composition.

The following examples will aid in explaining but expressly not limit the instant invention. Unless otherwise noted, all parts and percentages are by weight.

PREPARATION OF PHOTOCURABLE COMPOSITIONS USED AS BONDING AGENTS

EXAMPLE I 22.6 g. commercially available mixture of 25 wt. percent partially polymerized diallyl orthophthalate, balance diallyl orthophthalate monomer having a viscosity in the range 500–700 centipoises, 17.4 g commercially available pentaerythritol tetrakis (β-mercaptopropionate) 0.80 g benzophenone and as stabilizers 0.16 g 2,6-ditertiary-butyl-4-methylphenol commercially available under the tradename "Ionol" from Shell Chemical Co., 0.08 g octadecyl β-(4-hydroxy-3,5-di-t-butylphenyl) propionate commercially available from Geigy Chemical Co. under the tradename "Irganox 1076" and 0.008 g $H_3PO_3$ were admixed at 50°C for ½ hour to obtain a uniform admixture. This photocurable composition will hereinafter be referred to as Photosensitive Composition A. Photosensitive Composition A in its cured state had a refractive index of 1.5610 at 21°C.

15.0 g commercially available diallyl chlorendate, 7.74 g commercially available pentaerythritol tetrakis (β-mercaptopropionate), 0.23 g benzophenone and as stabilizers 0.0045 g $H_3PO_3$ and 0.0045 g pyrogallol were admixed at room temperature (22°C) for one half hour at which time a uniform admixture was obtained. This photocurable composition will hereinafter be referred to as Photosensitive Composition B. Photosensitive Composition B in its cured state had a refractive index of 1.5610 at 21°C.

32.2 g commercially available triallyl cyanurate, 67.8 g of commercially available tris-hydroxyethyl isocyanurate-tris mercaptopropionate, 1.0 g benzophenone and as stabilizers 0.02 g $H_3PO_3$, 0.01 g pyrogallol and 0.01 g hydroquinone were admixed for ½ hour at 40°C to obtain a uniform admixture. This photocurable composition will hereinafter be referred to as Photosensitive Composition C. Photosensitive Composition C in its cured state had a refractive index of 1.5626 at 21°C.

50 g. of commercially available pentaerythritol tetramethacrylate were admixed with 0.5 g. of benzoin methyl ether at room temperature (22°C) for 20 minutes at which time a uniform admixture was obtained. This admixed composition will hereinafter be referred to as Photosensitive Composition D.

25 g. of commercially available polyethylene glycol dimethacrylate, 25 g. of commercially available 1,6 hexane diol diacrylate and 0.5 g. of benzoin isobutyl ether were admixed at room temperature (22°C) for ½ hour to obtain a uniform admixture. This composition will hereinafter be referred to as Photosensitive Composition E.

25 g. of commercially available diallyl orthophthalate monomer, 25 g. of partially polymerized linear diallyl orthophthalate commercially available from FMC under the tradename "Dapon 35" and 1 g. of benzophenone were admixed at 22°C for ½ hour to obtain a uniform admixture. This photosensitive composition will hereinafter be referred to as Photosensitive Composition F.

A polyester was prepared by reacting equal mole quantities of maleic acid and 1,2 propylene glycol in the presence of trace $H_2SO_4$ at room temperature (22°C) and atmospheric pressure in a liter beaker equipped with stirrer. The resulting polyester had a molecular weight of 7,000. 50 g. of the resulting polyester was admixed with 50 g. of styrene monomer and 1 g. of benzoin for ½ hour at 22°C to obtain a uniform admixture. This photosensitive composition will hereinafter be referred to as Photosensitive Composition G.

EXAMPLE II

To a glass slide having thereon a specimen consisting of a dandelion stamen and pistils was added several drops of Photosenstive Composition A to cover the dandelion specimen. A 5 mil thick cover glass was placed over the specimen and in contact therewith and the specimen mount was exposed to UV radiation from a Blak-Ray Model B-100A long wave UV lamp at a distance of 5 inches and a surface intensity on the cover glass of 500 microwatts/cm² for a period of 5 minutes followed by exposure to UV radiation from a Ferro Allied Ultraviolet Energy Source Module having a 1,440 watt, 24 inch, GE-H24T3 high pressure mercury lamp in a parabolic reflector at a distance of 15 inches and a surface intensity on the cover glass of 8,600 microwatts/cm$^2$ for a period of 20 seconds. The resulting mount showed that the specimen and cover glass were held in a rigid fixed position on the glass slide by the cured transparent polythioether bonding agent. On inspection under a microscope, the specimen exhibited excellent resolution in all oculars. It was possible to observe spores and their shapes in the sporangum under 4.5X and 10X.

The example was repeated except that the specimen was clover stamens and pistils. The results were substantially the same.

EXAMPLE III

To a glass slide having thereon a dandelion stamen and pistils was added several drops of Photosensitive Composition B to cover the dandelion specimen. A 5 mil thick cover glass was placed over the specimen and in contact therewith and the specimen mount was exposed to UV radiation from a Blak-Ray Model B-100A long wave UV lamp at a distance of 5 inches and a surface intensity on the cover glass of 500 microwatts/cm$^2$ for a period of 5 minutes followed by exposure to UV radiation from a Ferro Allied Ultraviolet Energy Source Module having a 1,440 watt, 24 inch, GE-H24T3 high pressure mercury lamp in a parabolic reflector at a distance of 15 inches and a surface intensity on the cover glass of 8,600 microwatts/cm$^2$ for a period of 20 seconds. The resulting mount showed that the specimen and cover glass were held in a rigid fixed position by the cured transparent bonding agent. On inspection under a microscope the specimens exhibited excellent resolution in all oculars. It was possible to observe spores and their shapes in the sporangum under 4.5X and 10X.

The example was repeated except that the specimen was clover stamens and pistils. The results were substantially the same

EXAMPLE IV

A drop of human blood was placed on a glass slide and a cover slide was drawn across the blood specimen. The specimen containing slide was passed through a flame to dry the specimen, followed by the addition of a drop of Wright's stain to color the corpusules. The stained specimen was then washed with water and dried. The specimen was then covered with a 1 mil thick layer of Photosensitive Composition C. A 5 mil thick cover glass was placed over the specimen and in contact therewith and the specimen mount was exposed to UV radiation from a Blak-Ray Model B-100A long wave UV lamp at a distance of 5 inches and a surface intensity on the cover glass of 500 microwatts/cm$^2$ for a period of 5 minutes followed by exposure to UV radiation from a Ferro Allied Ultraviolet Energy Source Module having a 1,440 watt, 24 inch, GE-H24T3 high pressure mercury lamp in a parabolic reflector at a distance of 15 inches and a surface intensity on the cover glass of 8,600 microwatts/cm$^2$ for a period of 20 seconds. The resulting mount showed that the specimen and cover glass were held in a rigid fixed position by the transparent cured polythioether bonding agent. On inspection under a microscope the specimen showed that lysis did not occur and no stretching was apparent.

EXAMPLE V

To a glass slide having thereon a specimen consisting of a dandelion stamen and pistils was added several drops of Photosensitive Composition D to cover the dandelion specimen. A 5 mil thick cover glass was placed over the specimen and in contact therewith and the specimen mount was exposed to UV radiation from a 275 watt RS Westinghouse sunlamp at a distance of 4 inches and a surface intensity on the cover glass of 16,000 microwatts/cm$^2$ for a period of 1 minute. The resulting mount showed that the specimen and cover glass were held in a rigid fixed position on the glass slide by the transparent bonding agent. On inspection under a microscope, the specimen exhibited excellent resolution in all oculars. It was possible to observe spores and their shapes in the sporangum under 4.5X and 10X.

The example was repeated except that the specimen was clover stamens and pistils. The results were substantially the same.

EXAMPLE VI

Example V was repeated except that Photosensitive Composition E was substituted for Photosensitive Composition D. The results were the same.

EXAMPLE VII

Example V was repeated except that Phtosensitive Composition F was substituted for Photosensitive Composition D. The results were the same.

EXAMPLE VIII

Example V was repeated except that Photosensitive Composition G was substituted for Photosensitive Composition D. The results were the same.

EXAMPLE IX

Example V was repeated except that Photosensitive Composition C was substituted for Phososensitive Composition D. The results were the same.

EXAMPLE X

Example IV was repeated except that Photosensitive Composition D was used in place of Photosensitive Composition C. The results were substantially the same.

EXAMPLE XI

Example IV was repeated except that Photosensitive Composition E was used in place of Photosensitive Composition C. The results were substantially the same.

EXAMPLE XII

Example IV was repeated except that Photosensitive Composition F was used in place of Photosensitive Composition C. The results were substantially the same.

EXAMPLE XIII

Example IV was repeated except that Photosensitive Composition G was used in place of Photosensitive Composition C. The results were substantially the same.

What is claimed is:

1. The method of securing a cover glass to a glass slide having a specimen thereon which comprises covering the glass slide in the region of the specimen with a substantially uniformly thick layer of a liquid photosensitive composition consisting essentially of an optically transparent liquid photosensitive material having a viscosity in the range 50 to 2,000,000 centipoises at 25°C and 0.0005 to 50 percent by weight of the photosensitive material of a photoinitiator, positioning a cover glass over the specimen in contact with the photosensitive composition and thereafter exposing said photosensitive composition to UV radiation to form a solid, optically transparent bond holding the cover glass and the specimen in a fixed position on the glass slide.

2. The method according to claim 1 wherein the photosensitive composition is a member of the group consisting of:

A. 98 to 2 percent by weight of said composition of a polyene containing at least two reactive unsaturated carbon to carbon bonds per molecule, (2) 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than 4, and (3) 0.0005 to 50 percent by weight of said composition of a photoinitiator, B. an unsaturated ester and 0.0005 to 50 percent by weight of said ester of a photoinitiator, C. an acrylate and 0.0005 to 50 percent by weight of said acrylate of a photoinitiator.

D. a methacrylate and 0.0005 to 50 percent by weight of said methacrylate of a photoinitiator, E. mixtures of acrylates and methacrylates and 0.0005 to 50 percent by weight of said mixture of a photoinitiator.

3. A mounted specimen comprising a glass slide and a cover glass with a specimen therebetween, said glass slide, cover glass and specimen being held in a fixed position by a bonding agent consisting essentially of an optically transparent, solid photosensitized composition.

4. The mounted specimen according to claim 3 wherein the bonding agent is a member of the group consisting of a polythioether, a polyacrylate, a polymethacrylte and a crosslinked polyester.

* * * * *